(12) United States Patent
Kirstätter

(10) Patent No.: US 9,370,975 B2
(45) Date of Patent: Jun. 21, 2016

(54) APPARATUS AND METHOD FOR MOUNTING AND DEMOUNTING A TIRE TO OR FROM A RIM OF A VEHICLE WHEEL

(75) Inventor: Klaus Kirstätter, Wetzlar (DE)

(73) Assignee: SNAP-ON EQUIPMENT SRL A UNICO SOCIO, Correggio (RE) (IT)

( * ) Notice: Subject to any disclaimer, the term of this patent is extended or adjusted under 35 U.S.C. 154(b) by 1145 days.

(21) Appl. No.: 13/369,124

(22) Filed: Feb. 8, 2012

(65) Prior Publication Data

US 2012/0205054 A1   Aug. 16, 2012

(30) Foreign Application Priority Data

Feb. 8, 2011 (EP) ..................................... 11153727

(51) Int. Cl.
*B60C 25/138* (2006.01)
*B60C 25/132* (2006.01)
*B60C 25/05* (2006.01)

(52) U.S. Cl.
CPC ........... *B60C 25/138* (2013.01); *B60C 25/0527* (2013.04); *Y10T 29/49494* (2015.01)

(58) Field of Classification Search
CPC .. B60C 25/138; B60C 25/0527; B60C 25/04; B60C 25/0545; B60C 25/0551; B60C 25/056; B60C 25/132; Y10T 29/49494
See application file for complete search history.

(56) References Cited

U.S. PATENT DOCUMENTS

| | | | |
|---|---|---|---|
| 3,877,505 A | 4/1975 | Besuden et al. | |
| 6,877,544 B2 † | 4/2005 | Kane | |
| 7,089,987 B2 † | 8/2006 | Gonzaga | |
| 7,604,035 B2 * | 10/2009 | Lehr | B60C 25/138 157/1.17 |
| 8,250,915 B1 * | 8/2012 | Voeller | G01M 17/021 73/460 |
| 8,284,390 B1 * | 10/2012 | Clasquin | B60C 25/0554 356/139.01 |
| 8,387,675 B1 * | 3/2013 | Vaninger | B60C 25/138 157/1.17 |
| 8,613,303 B1 * | 12/2013 | Hanneken | B60C 25/138 157/1.17 |
| 8,770,254 B1 * | 7/2014 | Hanneken | B60C 25/138 157/1.17 |

(Continued)

FOREIGN PATENT DOCUMENTS

| | | | | |
|---|---|---|---|---|
| CN | 101629815 A | 1/2010 | | |
| DE | 4202803 C1 * | 7/1993 | ............ | B60C 25/025 |

(Continued)

OTHER PUBLICATIONS

European Office Action issued in European Application No. 11 153 727.0 Mar. 29, 2012.

(Continued)

*Primary Examiner* — David B Thomas
(74) *Attorney, Agent, or Firm* — McDermott Will & Emery LLP

(57) ABSTRACT

An apparatus for mounting and demounting a tire on and from a rim of a vehicle wheel. The apparatus comprises at least one fitting or removal tool for mounting and demounting the tire, and a control unit for controlling movement of the fitting or removal tool. A load measuring device measures the load applied on the tool while mounting or demounting the tire. A counterpart method comprises moving the fitting or removal tool towards or away from the vehicle wheel for mounting or demounting the tire to and from the rim, capturing the load applied to the tire by the fitting or removal tool, calculating the load applied to the tire by the fitting or removal tool while mounting or demounting the tire, and controlling movement of the fitting or removal tool on the basis of the load applied to the tire by the tool.

14 Claims, 1 Drawing Sheet

(56) References Cited

U.S. PATENT DOCUMENTS

| | | | | |
|---|---|---|---|---|
| 2010/0013913 A1* | 1/2010 | Vignoli | ............... | B60C 25/0554 348/61 |
| 2010/0108271 A1* | 5/2010 | Matteucci | ............. | B60C 25/138 157/1.24 |
| 2011/0100558 A1* | 5/2011 | Corghi | .................. | B60C 25/056 157/1.1 |
| 2012/0199293 A1* | 8/2012 | Corghi | .................. | B60C 25/056 157/1.24 |
| 2012/0267054 A1* | 10/2012 | Kirstatter | ............ | B60C 25/0557 157/1.22 |

FOREIGN PATENT DOCUMENTS

| | | | |
|---|---|---|---|
| DE | 42 05 045 C1 | 8/1993 | |
| EP | 2 319 715 A1 | 5/2011 | |
| EP | 1479538 B1 † | 5/2011 | |
| IT | MI 951 050 | 11/1996 | |
| WO | 9942309 A1 | 8/1999 | |
| WO | WO 99/42309 A1 | 8/1999 | |

OTHER PUBLICATIONS

Chinese Office Action issued in Chinese Patent Application No. 2012100296228 dated Nov. 16, 2015, with English Translation.

\* cited by examiner
† cited by third party

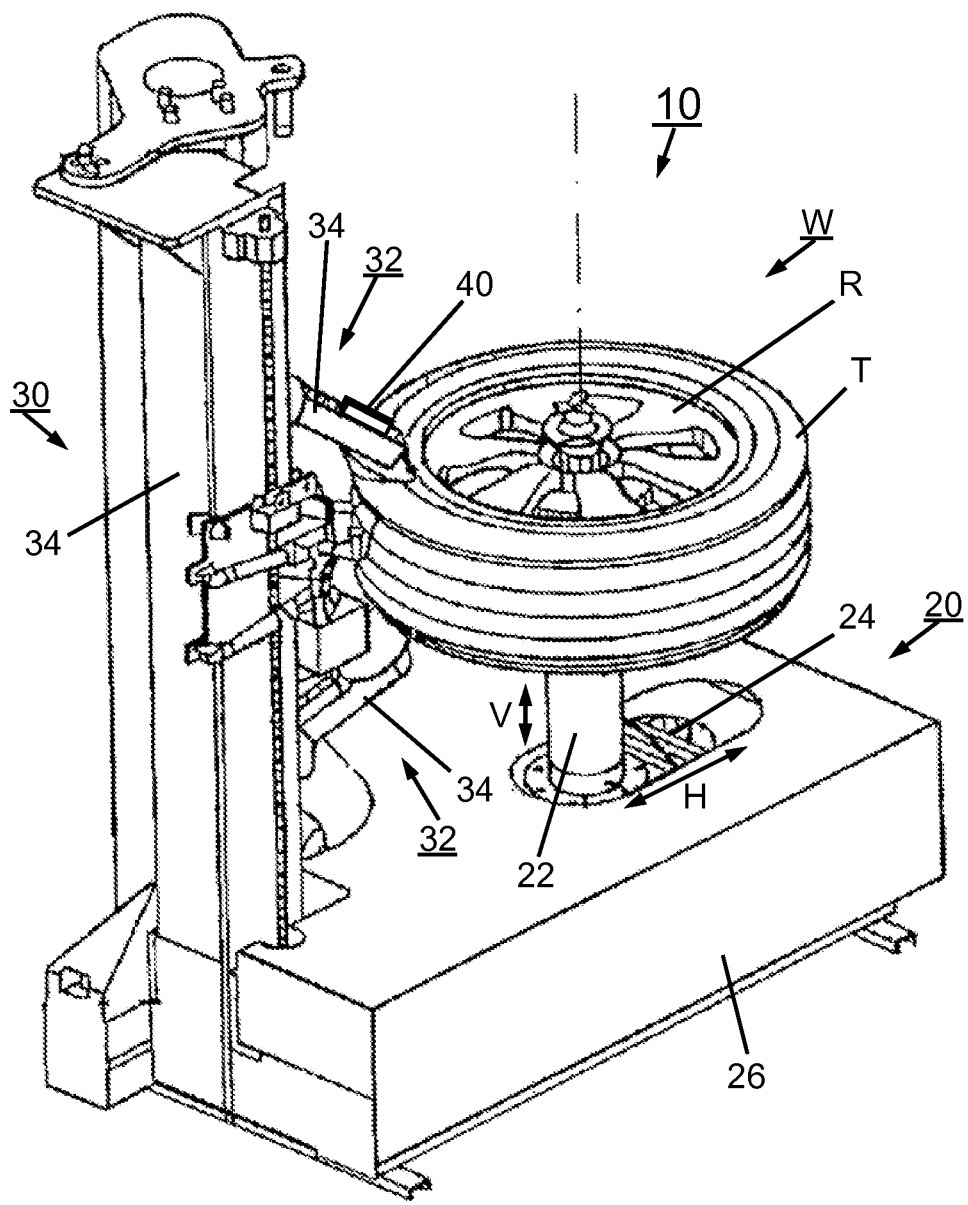

APPARATUS AND METHOD FOR MOUNTING AND DEMOUNTING A TIRE TO OR FROM A RIM OF A VEHICLE WHEEL

The present invention relates to an apparatus and a method for mounting a tire on a rim of a vehicle wheel and for demounting a tire from a rim of a vehicle wheel.

Apparatuses for mounting a tire on a rim of a vehicle wheel and for demounting a tire from a rim of a vehicle wheel are commonly known. Said apparatuses normally comprise receiving means for accommodating and rotatable holding the rim of the vehicle wheel. Moreover, fitting or removal tools are provided, which, in order to mount or demount the tire to or from the rim, may be moved towards the rim or away from the rim.

Such a known apparatus being disclosed in U.S. Pat. No. 3,877,505 has a receiving device to which the rim of a motor vehicle wheel can be fixed. The receiving device can be rotated during the fitting or removal operation by means of a rotary drive device, for example an electric motor. The tire can be mounted to the rim or demouted from the rim by means of fitting or removal tools. Provided on the removal tool is a sensing device in the form of a projection which senses the radial outside surface (rim bed) of the rim and which comprises a material avoiding a damaging of the rim material, for example plastic material. Due to this projection, the removal tool is kept at a given spacing from the surface of the rim in the removal operation, so the rim surface cannot be damaged by the hard material of the removal tool. In that case, however, there is the danger that the projection which senses the rim contour and which maintains the spacing, wears away due to abrasion or is damaged in some other fashion.

From DE patent 42 05 045, an apparatus and a method for mounting and demounting a tire to or from a rim of a vehicle wheel is known, wherein the fitting or removal tool are driven by an electric motor. In order to avoid damages of the tire during the mounting or demounting operation, the current supplied to the drive motor of the fitting or removal tools is stepwise or continuously raised or lowered according to tire specific current values stored in the control unit of the mounting apparatus. Thereby, based on said specific current values, a predefined load is applied to the tire to be mounted or demounted. Due to mechanical problems occurring to the tool drive or the fitting tools, using a tire specific (stepwise) constant current may lead to a change in the load applied to the tire, and thus to a damage of said tire.

Thus, it is an object of the present invention to provide an apparatus and a method for mounting and demounting a tire to or from a rim of a vehicle wheel, with which the above mentioned drawbacks can be overcome and with which the mounting and demounting process may be assured, in particular, with which damages of the tire during the mounting or demounting process may be omitted.

The aforesaid object with regard to the mounting or demounting apparatus is achieved by the features of independent claim 1, whereas the aforesaid object with regard to the mounting or demounting method is achieved by the features of independent claim 7. Advantageous configurations of the apparatus according to the present invention are defined in claims 2 to 6, and with regard to the method in claims 8 to 11.

In accordance with the present invention, there is provided an apparatus for mounting a tire on a rim of a vehicle wheel and for demounting a tire from a rim of a vehicle wheel. The apparatus comprises at least one fitting or removal tool for mounting and demounting the tire to or from the rim, and a control unit for controlling at least the movement of the at least one fitting or removal tool.

In the inventive apparatus, a load measuring device is attached to the at least one fitting or removal tool for measuring the load applied to said at least one fitting or removal tool while mounting or demounting said tire to or from said rim. A load measuring device attached to the fitting tool allows an exact determination of the load applied to the tire, independently from e.g. the construction of the tire mounting apparatus and/or the wheel and/or the tire. Moreover, a constant load measuring may be executed during the complete mounting or demounting process.

In an advantageous configuration, the load measuring device is coupled to the control unit. In case of an improper change in the value of the actual load applied to the tire or in case of an exceed over a predetermined threshold value or a range of tolerable values, the mounting or demounting process may be stopped by the control unit. In case that more than one fitting or removal tool is provided, e.g. an upper and a lower tool, and each tool comprises a separate tool drive, the control unit may also individually adjust the tool drive of each tool, e.g. reduce or increase the advance of the tool drive depending on the actually measured load.

The load measuring device may be of different constructions. In a further advantageous configuration of the inventive apparatus, the load measuring device includes at least one strain gauge. With said strain gauge, the deformation of the fitting or removal tool may be detected, which is directly proportional to the load applied to the tire by said tool. Additionally, by using a strain gauge for detecting the deformation of the fitting or removal tool, a permanent and real time load measurement is possible, which allows an exact controlling of the mounting and demounting process. Alternatively, the load measuring device may comprise a piezo element, wherein a deformation is directly converted into a voltage corresponding to the load applied to the tire.

In order to determine the load applied to the tire in more than one direction, e.g. vertical and horizontal, more than one measuring device may be attached to the fitting or removal tool, i.e. one measuring device for each direction to be measured.

Since the measurement results by using a strain gauge, which includes at least one resistor, depends on the temperature of said resistor, also a temperature measurement may be made, and the result may be included into the calculation of the actual load. Thereby, also the temperature of the tire may be estimated, 30 since some characteristics of a tire are temperature dependent, like the softness of the rubber or the crack sensitivity.

The deformation of the fitting or removal tool may also be measured by a contactless measuring device, like a camera system. Said camera system may detect markers on the fitting or removal tool and their positional deviations during a deformation of the tool, on the basis of which the load applied to the tire may be determined. A contactless measuring system may be installed as an upgrade to existing mounting or demounting apparatuses. For determining the deformation of the fitting or removal tool, more than one camera may be directed to the fitting or removal tool for detecting the deformation in more than one direction.

For mounting or demounting a tire to or from a rim, said rim is fixed to a receiving means of the tire changer, like a shaft. During the mounting or demounting operation, the rim is rotated via said receiving means, whereby also a load is applied to said receiving means or shaft. In a proffered embodiment, the receiving means comprise at least one load measuring device for chaptering the load applied thereto during the mounting or demounting procedure.

In a preferred embodiment with the present invention, a printing device is provided for printing data regarding the mounting or demounting process. A print out of the conditions, like the load applied to the tire during the mounting process, may be part of the quality control and may further be used to verify a correct mounting process, e.g. in case of an accident.

According to the present invention, there is further provided a method for mounting a tire on a rim of a vehicle wheel and for demounting a tire from a rim of a vehicle wheel. The method comprises the steps of moving the at least one fitting or removal tool towards the vehicle wheel for mounting the tire to the rim demounting the tire from the rim, capturing the load applied to the at least one fitting or removal tool while mounting or demounting said tire to or from said rim, calculating the load applied to the tire by the fitting or removal tool while mounting or demounting said tire to or from said rim, and controlling the movement of the at least one fitting or removal tool on the basis of the load applied to said tire by the at least one fitting or removal tool.

Moreover, in the inventive method, the load applied to the at least one fitting or removal tool is calculated on the basis of the deformation of said at least one fitting or removal tool. Advantageously, the deformation of said at least one fitting or removal tool is sensed by a strain gauge.

Furthermore, according to the inventive method, a threshold value for the deformation of said at least one fitting or removal tool is stored in the control unit.

On the basis of said threshold values, the mounting/demounting apparatus is stopped when a threshold value or a tolerable range for the deformation of said at least one fitting or removal tool is exceeded. Further advantageously, additional threshold values may be given, e.g. lower threshold values, by falling below said values, the advance of the fitting or removal tool is raised, or a median value causing a constant advance of said tool.

The method according to the present invention comprises the step of capturing the load applied to the receiving means.

In a next step, the load values applied to the fitting or removal tool are correlated to the load applied to the receiving means.

Based on the correlation results, the tire changer may be controlled by the control unit. For controlling the tire changer on the basis of the correlation results, a characteristic diagram or an optional field of values may be given defining threshold values or a range of acceptable values.

The correlation of said load values may register various values, like the differences between the respective load values or their relation. The characteristic diagram or a threshold value may define a range or maximum and/or minimum values of said differences or a percentage value for the relation between the respective load values.

Additionally, the temperature of the tire and/or the ambience may be included into the control procedure. E.g. the temperature may be correlated to the single load applied to the tire by the respective fitting or removal tool and/or the load applied to the receiving means. Otherwise, the temperature may also included into the correlation of these load values. The characteristic diagram or a threshold value used for the correlation of the load values, may include e.g. a temperature depending component or factor.

The inventive method for mounting a tire on a rim to of a vehicle wheel and for demounting a tire from a rim of a vehicle wheel provides the same advantages as disclosed in conjunction with the inventive mounting or demounting apparatus.

Further advantages and a preferred embodiment will be described in the following together with the sole drawing. The expressions "left", "right", "below" and "above" are referred to said drawing in an alignment such that the reference numbers used can be read in a normal orientation.

In FIG. 1, a tire changer 10 according to the present invention is shown. Tire changer 10 comprises a receiving unit 20 including a vertically arranged receiving shaft 22 and drive means 24 for rotating shaft 22 about its longitudinal axis A and for reversibly moving shaft 22 in a vertical direction V along axis A and in a horizontal direction indicated by arrow H. Shaft 22 projects upwardly from a housing 26 in which drive means 24 are accommodated.

A vehicle wheel W comprising a rim R and a tire T, is centrally mounted to the upper end of shaft 22 in a horizontal orientation by rim R by clamping means (not shown).

Tire changer 10 further comprises a column-like mounting and demounting unit 30, which is attached to the left side, as shown in FIG. 1, to housing 26 of receiving unit 20. Mounting and demounting unit 30 includes several fitting or removal tools 32 each of which is attached to the column-like unit 30 via an arm 34 and include a common drive or separate drives for each tool 32 or a common drive for some of the tools and separate for the other tools (all not shown) for being vertically drivable along a housing 36 of mounting and demounting unit 30. As it can be seen in FIG. 1, arms 34 of fitting tool 32 are mounted at one end to the drive means, whereas their second ends are directed towards the side walls of tire T. It has to be noted that housing 36 includes guide means for guiding fitting or removal tool 32 when they are vertically moved by their respective drives.

As it further can be seen in FIG. 1, load measuring devices 40 are attached to each or some or all arms 34 of fitting or removal tools 32. In FIG. 1, only one measuring device 40, which is attached to the upper surface of the upper arm 34, is visible. Measuring device 40 attached to the lower arm 34 of fitting or removal tool 32, is mirror-inverted mounted to the lower surface of said lower arm 34, and thus, not visible in FIG. 1.

Tire changer 10 naturally comprises a control unit (not shown), for controlling the mounting and demounting process, by controlling the movement of the fitting or removal tools 32 and the movement and rotation of shaft 22 of receiving unit 20. The control unit includes a storing device in which at least maximum threshold values for the load to be applied to the tire T during the mounting/demounting procedure, are stored, and in which the values of the load applied to tire T, measured during the mounting/demounting process, are stored.

For mounting or demounting a tire T to or from a rim R of a vehicle wheel W, vehicle wheel W is mounted to the upper end of shaft 22 by rim R. For an easier handling, shaft 22 may horizontally be moved away from mounting and demounting unit 30 and vertically downwardly. In this position, rim R is mounted to shaft 22 by respective clamping means. Thereafter, wheel W is moved together with shaft 22 upwardly to a height centrally between fitting or removal tool 32 and then towards mounting and demounting unit 30 into a position wherein tire T is placed between fitting or removal tools 32, as shown in FIG. 1. For mounting or demounting tire T to or from rim R, fitting or removal tools 32 are moved towards or away from tire T, respectively. At the same time, rim R is rotated by shaft 22. Thereby, fitting or removal tools 32 engaging tire T.

The fitting or removal tools 32 include all tools necessary for mounting or demounting a tire T to a rim R of a vehicle wheel W. For demounting tire T from rim R, bead release rollers, as one kind of fitting or removal tools 32, are pressed against the side walls of tire T for releasing the bulge of tire T from rim R. Thereafter, a removal hook, as a further kind of fitting or removal tool 32, is placed between the bulge of tire T and rim R, and engages behind tire T. The removal hook is than moved away from rim R, thereby, the bulge of tire T is pulled from rim R. In order to mount tire T on rim R, a mounting tool is pressed against the bulge of tire T, which thereby is pushed over rim R. Said mounting tool, which is another kind of fitting or removal tool 32, has also a hook-like section which has a shape corresponding to the outer surface of the bulge of tire T.

It has to be noted that the removal hook as a demounting tool and the mounting tool would be combined and could be arranged on a common tool bracket. It is also possible that the demounting tool is used in the same configuration as the mounting tool.

Moreover, removal hook and the hook-like mounting tool may be attached to a common arm 34. In this case, according to the intended procedure (mounting or demounting), the respective tool is positioned relative to tire T and rim R. On the other hand, each of said demounting and mounting tools may, as the bead release rollers, comprise a separate tool arm including a common drive or separate drives for each of said arms. For executing a mounting or demounting procedure, the respective fitting or removal tool 32 is positioned relative to tire T and rim R.

In FIG. 1, bead release rollers are shown, which are in contact with the side walls of tire T. For demounting tire T from rim R, said bead release rollers are shifted towards each other and against the side walls of tire T, by respective drives.

When engaging tire T, fitting or removal tools 32 apply a load to tire T, in particular to the side wall and/or the bulge of tire T. Thereby, arms 34 of tool 32 are deformed, or strictly said, they are bent in a vertical direction caused by the advance movement of the drives of tools 32, and in a horizontal direction caused by the rotation of wheel W. Based on the direction and the degree of the deformation (displacement) of arms 34 of fitting or removal tools 32, the load applied to tire T may be calculated.

The deformation of arms 34 is detected by measuring devices 40, which e.g. include a strain gauge, which is coupled to the control unit of tire changer 10. In a calculation section, included in the control unit, the load applied to tire T is calculated. The calculated load is compared to a predetermined load, which is dependent on the specific type of tire R stored as a default value in the storage device of the control unit. Moreover, threshold values are given to each of the default values. Threshold values may define a maximum allowable load and/or a minimum load. In case that the maximum load is reached or exceeded, the control unit acts on the drives of fitting or removal tools 32. When the threshold value for the maximum allowable load is reached, the advance of tools 32 is reduced, whereby also the load applied to tire T should be reduced. In case that the reduction of the load is not sufficient, the advance of tools 32 is stopped. On the other hand, in case the load applied to tire T, falls below a minimum value, the advance of drives of fitting or removal tools 32 may be increased until a default value is reached.

During a mounting or demounting process, normally, the load applied to tire T, starting by zero immediately before fitting or removing tools 32 engaging tire R, raising to a maximum value and, after tire T is mounted or demounted, the load degreases to a constant low lever (near zero).

Thus, by detecting a raising load at the beginning of the mounting or demounting process, the control unit may start controlling the process as described above, and, when detecting a constant load at a low level, the end of the mounting or demounting process may be identified. Accordingly, respective signals may be output to a user, and in the later case, tire changer 10 may be stopped.

Alternatively to a strain gauge, load measuring device 40 may comprise a piezo element for detecting the deformation of arms 34 of fitting or removal tool 32.

Independently from the kind of measuring devices 40, more than one piezo element or strain gauge may be attached to arms 34 of fitting or removal tool 32, e.g. two of each measuring elements may be used to detect deformations of arms 34 in a plane or both directions, vertically and horizontally.

Measuring device 40 according to the embodiment of FIG. 1 has been described as mounted on arms 34 of fitting or removal tool 32. Naturally, when appropriate, load measuring device 40 may also be attached to the tip of fitting or removal tool 32, e.g. at the side surface of the bead release rollers of FIG. 1, facing away from tire T. In an alternative embodiment, load measuring device 40 may also accommodated inside arms 34 of fitting or removal tool 32, e.g. in a bore or groove provided in arms 34.

A camera system may also additionally or alternatively be used to detect deformations of arms 34 of fitting or removal tools 32. Markers attached to arms 34, are detected by said camera system and a displacement of said markers may be detected. On the basis of said displacement of the markers, the deformation of arms 34 and the respective load applied to tire T may be calculated.

Tire changer 10 also comprises a printing device for printing a journal including the run of the load curve during the mounting or demounting process, the duration and other characteristics, which may used to verify the mounting or demounting process.

In case that a camera system is used for determining the load applied to tire T, said camera system may also be used to identify the size and kind of tire T. Based thereon, the control unit may automatically choose the respective default values for the allowed load. Otherwise, a user may input the size and kind of tire T by hand, or a separate scanning device ma be provided for scanning tire T immediately before mounting or demounting to or from rim R.

It has to be understood that, since the load applied to tire R by tools 32 is measured separately for each of the tools 32, also controlling the movement of tools 32 may be executed separately. That means that e.g. the advance of both fitting or removal tools 32 may be different, depending on the load applied to tire R by the respective tool 32.

Moreover, also shaft 22 may comprise a load measuring device 40, like a strain gauge or a piezo element for capturing the load applied thereto during the mounting or demounting process.

The control unit of tire changer 10 may than also include the load applied to shaft 22, into the control operation. Additionally to a correlation and a separate control of the fitting or removal tools 32, also the load value captured from shaft 22 may be correlated to the load values from the fitting or removal tools 32. A characteristic diagram or an optional field of load values may be provided, defining an allowed range or threshold value for said correlation result. The correlation of said load values may register various values, like the differences between the respective load values or their relation. A characteristic diagram or a threshold value may define a range or maximum and/or minimum values of said differences or a percentage value for the relation between the respective load values.

A control step may than include stopping the mounting or demounting procedure when the predefined characteristic field is exceeded.

It has to be understood, that for each tire (kind and size) a specific characteristic diagram or a threshold value is provided. Moreover said characteristic values may further be correlated to the temperature of tire T and/or the ambience.

Additionally, a temperature sensing device may be provided and coupled to the control unit of tire changer 10. The temperature sensing device may sense the temperature in the region of load measuring device 40 to allow a correction of the measuring results, since e.g. a strain gauge includes a temperature sensitive resistor.

Alternatively or additionally, temperature sensing device may also sense the temperature of tire T. The temperature of tire T may also included into the calculation of the allowed load applied to tire T, since also tire T has temperature sensitive characteristics, like the softness of the rubber or crack sensitivity (?).

The invention claimed is:

1. Apparatus for mounting a tire on a rim of a vehicle wheel and for demounting a tire from a rim of a vehicle wheel, comprising:
    at least one fitting or removal tool for mounting and demounting the tire,
    a receiver for receiving the rim when mounting or demounting the tire to or from the rim,
    a control unit for controlling at least the movement of the at least one fitting or removal tool,
    a load measuring device attached to the at least one fitting or removal tool for measuring the load applied to said at least one fitting or removal tool while mounting or demounting said tire to or from said rim, and
    a printing device for printing data regarding the load applied to the tire during said mounting or demounting.

2. The apparatus according to claim 1,
    wherein the load measuring device is coupled to the control unit.

3. The apparatus according to claim 1,
    wherein the load measuring device comprises at least one strain gauge.

4. The apparatus according to claim 1,
    wherein the load measuring device comprises at least one piezo element.

5. The apparatus according to claim 1,
    wherein the load measuring device comprises a camera system.

6. The apparatus according to claim 1,
    wherein the receiver comprises at least one load measuring device.

7. A method for mounting a tire on a rim of a vehicle wheel and for demounting a tire from a rim of a vehicle wheel, the method comprising the steps of:
    rotating the rim mounted on a receiver, and moving the at least one fitting or removal tool towards the vehicle wheel for mounting the tire to the rim or demounting the tire from the rim,
    capturing the load applied to the tire by the at least one fitting or removal tool while mounting or demounting said tire to or from said rim,
    calculating the load applied to the tire by the fitting or removal tool while mounting or demounting said tire to or from said rim,
    controlling the movement of the at least one fitting or removal tool on the basis of the load applied to said tire by said at least one fitting or removal tool, and
    printing data regarding the load applied to the tire during said mounting or demounting.

8. The method according to claim 7,
    wherein the load applied by the at least one fitting or removal tool to said tire is calculated on the basis of the deformation of said at least one fitting or removal tool.

9. The method according to claim 7,
    wherein the deformation of said at least one fitting or removal tool is sensed by a strain gauge.

10. The method according to claim 7, wherein a threshold value for the deformation of said at least one fitting or removal tool is stored in a control unit.

11. The method according to claim 10,
    wherein the mounting/demounting apparatus is stopped when a threshold value for the deformation of said at least one fitting or removal tool is exceeded.

12. The method according to claim 7,
    wherein the method comprises the step of capturing the load applied to the receiver.

13. The method according to claim 12,
    wherein the method comprises the step of correlating the load values applied to the fitting or removal tool to the load applied to the receiving means receiver.

14. The method according to claim 13,
    wherein the method further comprises the step of controlling the tire changer on the basis of the correlation result.

* * * * *